United States Patent
Mohrschladt et al.

(10) Patent No.: US 6,316,588 B1
(45) Date of Patent: *Nov. 13, 2001

(54) CONTINUOUS PREPARATION OF POLYAMIDES FROM AMINONITRILES

(75) Inventors: Ralf Mohrschladt, Schwetzingen; Volker Hildebrandt, Mannheim; Eberhard Fuchs, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,957

(22) PCT Filed: Feb. 2, 1999

(86) PCT No.: PCT/EP99/00654

§ 371 Date: Jul. 25, 2000

§ 102(e) Date: Jul. 25, 2000

(87) PCT Pub. No.: WO99/38908

PCT Pub. Date: Aug. 5, 1999

(30) Foreign Application Priority Data

Feb. 2, 1998 (DE) .............................. 198 04 023

(51) Int. Cl.$^7$ .................................................. C08G 69/00
(52) U.S. Cl. ............................................................ 528/310
(58) Field of Search ..................... 528/310, 313, 528/324, 312, 329.1

(56) References Cited

U.S. PATENT DOCUMENTS

| | | | |
|---|---|---|---|
| 2,301,964 | * 11/1942 | Martin | 260/239 |
| 4,568,736 | 2/1986 | Curatolo et al. | 528/313 |
| 4,625,023 | * 11/1986 | Mares et al. | 540/539 |
| 4,628,085 | * 12/1986 | Mares et al. | 540/539 |
| 4,629,776 | 12/1986 | Curatolo et al. | 528/313 |
| 5,646,277 | 7/1997 | Fuchs et al. | 540/539 |
| 5,739,324 | * 4/1998 | Fuchs et al. | 540/539 |
| 5,874,575 | 2/1999 | Fuchs et al. | 540/539 |

FOREIGN PATENT DOCUMENTS

| | | |
|---|---|---|
| 35 34 817 A1 | 4/1987 | (DE) . |
| 43 39 648 A1 | 5/1995 | (DE) . |
| 44 43 125 A1 | 6/1996 | (DE) . |
| 196 35 077 A1 | 3/1998 | (DE) . |
| 0 479 306 A2 | 4/1992 | (EP) . |
| WO 98/08889 | 3/1998 | (WO) . |

* cited by examiner

Primary Examiner—P. Hampton-Hightower
(74) Attorney, Agent, or Firm—Keil & Weinkauf

(57) ABSTRACT

A continuous process for preparing a polyamide by reacting at least one aminonitrile with water comprises:

(1) reacting at least one aminonitrile with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in step 1, in the presence of a Brönsted acid catalyst as in (1), the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10$^6$ Pa to obtain a product mixture.

9 Claims, 1 Drawing Sheet

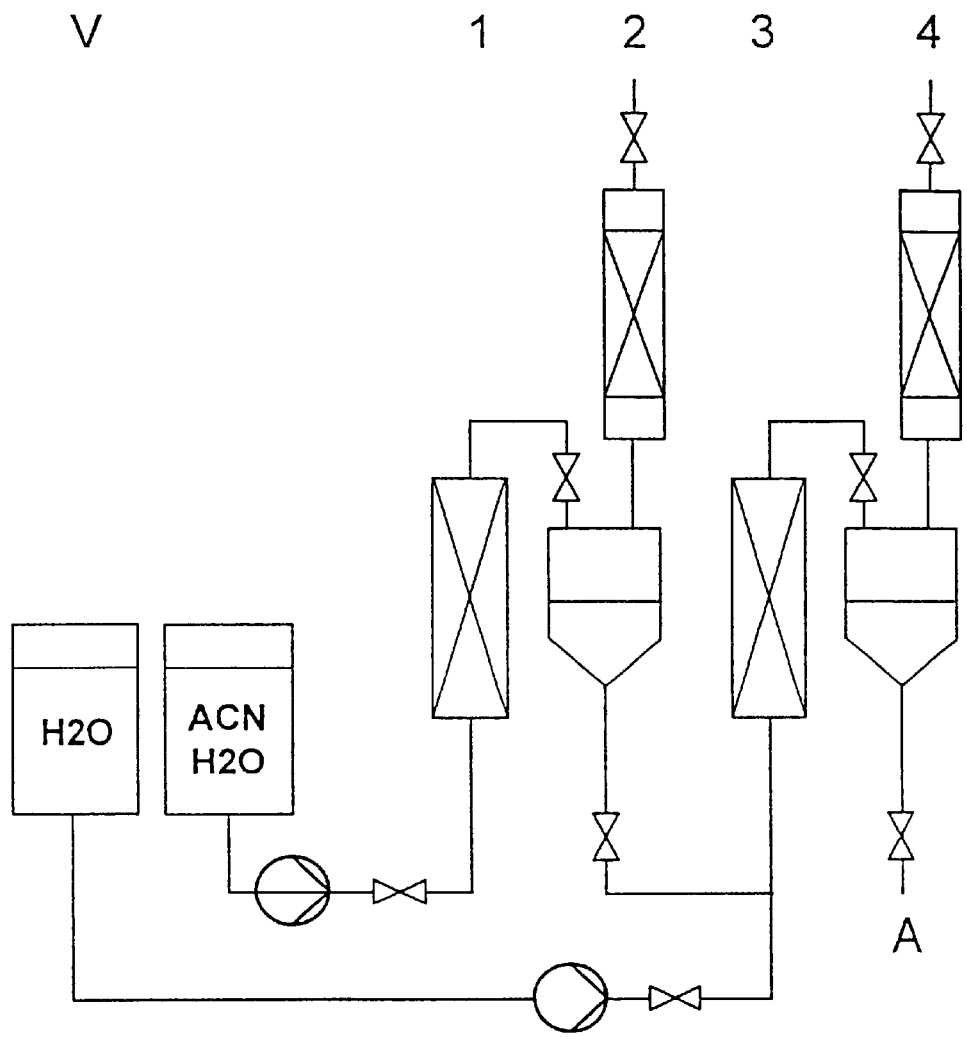

CONTINUOUS PREPARATION OF POLYAMIDES FROM AMINONITRILES

FIELD OF THE INVENTION

The present invention relates to a continuous process for preparing polyamides from aminonitriles and water at elevated temperature and elevated pressure.

PRIOR ART

U.S. Pat. No. 4,629,776 describes a catalytic process for producing polyamides from ω-aminonitriles such as ω-amino-capronitrile (ACN). ACN is reacted with water in the presence of a catalytic amount of an oxidized sulfur compound as catalyst. Sulfuric acid is an example of the catalyst used.

U.S. Pat. No. 4,568,736 describes a similar catalytic process for producing polyamides. The catalyst used in this case is an oxygen-containing phosphorus compound, phosphoric acid or a phosphonic acid.

Complete removal of catalyst is virtually impossible in either process. The presence of catalyst in the polymer can hinder the building of high molecular weight polymers and compromise later processing operations, for example spinning. Moreover, the level of volatiles in the polymers obtained is high, so that the polyamides are difficult to process.

EP-A-0 479 306 describes the production of polyamides from ω-aminonitriles. The ω-aminonitriles are reacted with water in the presence of an oxygen-containing phosphorus compound as catalyst. Once a reaction temperature from 200 to 260° C. has been obtained, ammonia and water are continuously removed by decompressing and at the same time water is continuously added, the pressure being selected within the range from 14 to 24×10$^6$ Pa (14–24 bar).

DE-A-43 39 648 relates to a process for producing caprolactam by reacting aminocarbonitriles with water in the liquid phase using heterogeneous catalysts. Suitable heterogeneous catalysts include acidic, basic or amphoteric oxides of the elements of main groups 2, 3 and 4 of the Periodic Table. Titanium dioxide can be used, for example. The catalyst is used in the form of extrudates, for example.

Existing processes have in some cases inadequate space-time yields and a molecular weight buildup which needs to be improved. In addition, the product is not always obtained in the requisite purity.

SUMMARY OF THE INVENTION

It is an object of the present invention to provide a process for preparing polyamides from aminonitriles and water with an improved molecular weight buildup and an improved space-time yield without contamination of the product compared with existing processes.

BRIEF DESCRIPTION OF THE DRAWING

FIG. 1 is a plan view of a multistage Miniplant apparatus suitable for carrying out the claimed process.

DETAILED DESCRIPTION OF THE INVENTION

We have found that this object is achieved according to the invention by a continuous process for preparing a polyamide by reaction of at least one aminonitrile with water, which comprises:

(1) reacting at least one aminonitrile with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in step 1, in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10$^6$ Pa to obtain a product mixture.

The present invention further provides a continuous process for preparing a polyamide by reaction of at least one aminonitrile with water, which comprises:

(1) reacting at least one aminonitrile with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in step 1, in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a product mixture.

The above processes preferably further comprise the following step:

(4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

The present invention further provides a continuous process for preparing a polyamide by reaction of at least one aminonitrile with water, which comprises:

(1) reacting at least one aminonitrile with water at a temperature from 90 to 400° C. and a pressure from 0.1 to $35 \times 10^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in step 1, in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (4) postcondensing the first liquid or the first solid phase or the mixture of first liquid and first solid phase at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

The principle of the process of the invention is described in prior DE-A-197 09 390, unpublished at the priority date of the present invention.

The aminonitrile in the mixture can be in principle any aminonitrile, ie., any compound having both at least one amino group and at least one nitrile group. ω-Aminonitriles are preferred, especially ω-aminoalkyl nitriles having from 4 to 12 carbon atoms, more preferably 4 to 9 carbon atoms, in the alkylene moiety, or aminoalkylaryl nitriles having from 8 to 13 carbon atoms, preferred aminoalkylaryl nitriles being aminoalkylaryl nitriles which have an alkylene group of at least one carbon atom between the aromatic unit and the amino and nitrile group. Especially preferred aminoalkylaryl nitrites are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, for example caprolactam or the below-defined mixture.

In a particular embodiment, especially if copolyamides or branched or chain-lengthened polyamides are to be prepared, the following mixture is used instead of pure 6-aminocapronitrile:

from 50 to 99.99, preferably from 80 to 90, % by weight of 6-aminocapronitrile, from 0.01 to 50, preferably from 1 to 30, % by weight of at least one dicarboxylic acid selected from the group consisting of aliphatic $C_4$–$C_{10}$-α,ω-dicarboxylic acids, aromatic $C_8$–$C_{12}$-dicarboxylic acids and $C_5$–$C_8$-cycloalkane-dicarboxylic acids, from 0 to 50, preferably from 0.1 to 30, % by weight of an α,ω-diamine having from 4 to 10 carbon atoms, from 0 to 50, preferably from 0 to 30, % by weight of an α,ω-$C_2$–$C_{12}$-dinitrile, and from 0 to 50, preferably from 0 to 30, % by weight of an α,ω-$C_5$–$C_{12}$-amino acid or of the corresponding lactam, from 0 to 10% by weight of at least one inorganic acid or salt thereof, the individual weight percentages adding up to 100%.

Suitable dicarboxylic acids include aliphatic $C_4$–$C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$–$C_{12}$-dicarboxylic acids such as terephthalic acid and also $C_5$–$C_8$-cycloalkanedicarboxylic acids such as cyclohexanedicarboxylic acid.

Suitable α,ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 6,6 salt.

The α,ω-$C_2$–$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkylene or arylene or alkylarylene compounds.

The α,ω-$C_5$–$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid or 12-aminododecanoic acid, preferably 6-aminohexanoic acid.

According to the invention, the first step (step 1) involves heating an aminonitrile with water at a temperature from about 90 to about 400° C., preferably about 180 to about 310° C., especially about 220 to about 270° C., to which a pressure from about 0.1 to about $15 \times 10^6$ Pa, preferably about 1 to about $10 \times 10^6$ Pa, especially about 4 to about $9 \times 10^6$ Pa, is set. In this step, the pressure and temperature can be adjusted relative to each other in such a way as to obtain a liquid or a solid phase and a mixture of liquid or solid phase and a gaseous phase.

According to the invention, water is used in a molar ratio of aminoalkyl nitrile to water within the range from 1:1 to 1:10, particularly preferably within the range from 1:2 to 1:8, very particularly preferably within the range from 1:2 to 1:6, preference being given to the use of water in excess, based on the aminoalkyl nitrile used.

In this embodiment, the liquid or solid phase or the mixture of liquid and solid phase corresponds to the reaction mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous. Of course, the pressure and temperature can also be adjusted relative to each other in such a way that the synthesis mixture is present as a single solid or liquid phase.

The removal of the gas phase can be effected by the use of stirred or unstirred separating vessels or vessel batteries and by the use of evaporator apparatus, for example by means of circulatory evaporators or thin-film evaporators, e.g., film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The two-phase procedure is preferably carried out at a pressure which is greater than the vapor pressure of pure water corresponding to the bulk temperature of the reaction mixture, but less than the equilibrium vapor pressure of ammonia.

A particularly preferred embodiment of the two-phase procedure utilizes an upright flow tube which is operated under upward flow and optionally has above the product outlet a further opening for gas phase removal. This tubular reactor can be fully or partially packed with catalyst pellets. In a preferred embodiment, the upright reactor utilized in the two-phase procedure is maximally packed with catalyst material up to the phase boundary.

In another, particularly preferred embodiment of the first step, the pressure is selected in such a way that the reaction mixture is present as a single liquid phase, i.e., no gas phase is present in the reactor. For this single-phase procedure, the preferred embodiment is a flow tube packed exclusively with catalyst material.

According to the invention, the aminonitrile/water mixture is heated with a heat exchanger before being introduced into the first step. It will be appreciated that the aminonitrile and the water can also be heated separately from each other and be mixed in the first step by the use of mixing elements.

As regards the residence time of the synthesis mixture in the first step, there are no restrictions whatsoever; however, it is generally selected within the range from about 10 minutes to about 10 hours, preferably within the range from about 30 minutes to about 6 hours.

Although there are no restrictions whatsoever concerning the degree of conversion of nitrile groups in step 1 either, economic reasons especially dictate that the conversion of nitrile groups in step 1 be generally not less than about 70 mol %, preferably at least about 95 mol %, and especially within the range from about 97 to about 99 mol %, each based on the moles of aminonitrile used.

The nitrile group conversion is customarily determined by means of IR spectroscopy (CN stretching vibration at 2247 wavenumbers), NMR or HPLC, preferably by IR spectroscopy.

Nor does the invention rule out conducting the reaction in step 1 in the presence of oxygen-containing phosphorus compounds, especially phosphoric acid, phosphorous acid and hypophosphorous acid and alkali metal and alkaline earth metal salts and ammonium salts thereof such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of ω-aminonitrile to phosphorus compounds is selected within the range from 0.01:1 to 1:1, preferably within the range from 0.01:1 to 0.1:1.

The reaction in step 1 is carried out in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide. If a very pure aminonitrile is used, the proportion of anatase in the titanium dioxide catalyst should be as high as possible. Preferably, a pure anatase catalyst is used. If the aminonitrile used contains impurities, for example from 1 to 3% by weight of impurities, preference is given to using a titanium dioxide catalyst comprising a mixture of anatase and rutile. Preferably, the proportion of anatase is from 70 to 80% by weight and the proportion of rutile from 20 to 30% by weight. Particular preference is given in this case to using a titanium dioxide catalyst comprising about 70% by weight of anatase and about 30% by weight of rutile. The catalyst preferably has a pore volume of from 0.1 to 5 ml/g, particularly preferably from 0.2 to 0.5 ml/g. The average pore diameter is preferably within the range from 0.005 to 0.1 μm, particularly preferably within the range from 0.01 to 0.06 μm. If highly viscous products are used, the average pore diameter should be large. The cutting hardness is preferably greater than 20 N, particularly preferably >25 N. The BET surface area is preferably more than 40 m$^2$/g, particularly preferably more than 100 m$^2$/g. If the BET surface area is smaller, the bed volume should be appropriately higher to ensure adequate catalyst activity. Particularly preferred catalysts have the following properties: 100% of anatase; 0.3 ml/g pore volume; 0.02 μm average pore diameter; 32 N cutting hardness; 116 m$^2$/g BET surface area or 84% by weight of anatase; 16% by weight of rutile; 0.3 ml/g pore volume; 0.03 μm average pore diameter; 26 N cutting hardness; 46 m$^2$/g BET surface area. The catalysts may be prepared from commercial powders as available for example from Degussa, Finti or Kemira. When tungsten oxide is used, up to 40% by weight, preferably up to 30% by weight, particularly preferably from 15 to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff. The catalyst can be used in any desired suitable form. It is preferably used in the form of shaped articles, extrudates or pellets, especially in the form of pellets. The pellets are preferably sufficiently large to be readily separable from the product mixture and not to impair the flowability of the product during the reaction.

The pellet form of the catalyst makes it possible to remove the catalyst mechanically at the point of exit from the first step. For example, mechanical filters or sieves are provided at the point of exit from the first step, for example. If the catalyst is additionally used in the second and/or third step, it is preferably present in the same form.

According to the invention, the reaction mixture obtained in the first step is further reacted in step 2 at a temperature from about 200 (150) to about 350 (400)° C., preferably at a temperature within the range from about 210 (200) to about 330 (330)° C., especially within the range from about 230 (230) to about 270 (290)° C., and a pressure which is lower than the pressure in step 1. The pressure in step 2 is preferably at least about 0.5×10$^6$ Pa lower than the pressure in step 1, and generally the pressure will be within the range from about 0.1 to about 45×10$^6$ Pa, preferably within the range from about 0.5 to about 15×10$^6$ Pa, especially within the range from about 2 to about 6×10$^6$ Pa (values in brackets: without catalyst).

In step 2, the temperature and pressure are selected so as to obtain a first gas phase and a first liquid or first solid phase or a mixture of first liquid and first solid phase, and the first gas phase is separated from the first liquid or first solid phase or from the mixture of first liquid and first solid phase.

The first gaseous phase, which consists essentially of ammonia and water vapor, is generally removed continuously by means of a distillation apparatus, for example a distillation column. Any organic constituents of the distillate coremoved in the course of this distillation, predominantly unconverted aminonitrile, can be wholly or partly recycled into step 1 and/or step 2.

The residence time of the reaction mixture in step 2 is not subject to any restrictions whatsoever, but is generally within the range from about 10 minutes to about 5 hours, preferably within the range from about 30 minutes to about 3 hours.

The product line between the first and second steps optionally contains packing elements, for example Raschig rings or Sulzer mixing elements, which facilitate a controlled expansion of the reaction mixture into the gas phase. This relates, in particular, to the single-phase procedure.

Preferably, the reactor of the second step likewise contains the catalyst material of the invention, especially in pellet form. The reactor provides a further improvement in product properties compared with a catalyst-free reactor especially at higher pressures and/or in the presence of a large amount of excess water in the reaction mixture. Temperature and pressure should be selected in such a way that the viscosity of the reaction mixture remains sufficiently small to prevent any blinding of the catalyst surface. According to the invention, the point of exit from the second process step too is equipped with sieves or filters which guarantee the purity of the reaction mixture and separate the catalyst from the reaction mixture.

In step 3, the first liquid or the first solid phase or the mixture of first liquid and first solid phase is admixed with a gaseous or liquid phase comprising water, preferably water or water vapor. This is done continuously. The amount of water added (as liquid) is preferably within the range from about 50 to about 1500 ml, more preferably within the range from about 100 to about 500 ml, based in each case on 1 kg of the first liquid or first solid phase or of the mixture of first liquid and first solid phase. This addition of water primarily compensates the water losses incurred in step 2 and furthers the hydrolysis of acid amide groups in the synthesis mixture. This results in a further advantage of this invention, that the mixture of the starting materials as used in step 1 can be used with a small excess of water only.

The water-comprising gaseous or liquid phase is preferably preheated in a heat exchanger before being introduced into step 3 and then mixed with the first liquid or the first solid phase or the mixture of first solid and first liquid phase. The reactor may optionally be fitted with mixing elements which further the mixing of the components.

Step 3 can be operated at a temperature from 150 to 370° C. and a pressure from 0.1 to 30×10$^6$ Pa; if a catalyst bed according to the invention is present, the conditions applicable to step 1 can be employed. Otherwise, the temperature is preferably 180–300° C., particularly preferably 220–280° C. The pressure is preferably from 1 to 10×10$^6$ Pa, particularly preferably from 2×10$^6$ to 7×10$^6$ Pa.

The pressure and temperature can be adjusted to each other in such a way that the synthesis mixture is present as a single liquid or solid phase. In another embodiment, the pressure and temperature are selected so that a liquid or a solid phase or a mixture of solid and liquid phase and also a gaseous phase are obtained. In this embodiment, the liquid or solid phase or the mixture of liquid and solid phase corresponds to the product mixture, whereas the gaseous phase is separated off. As part of this step, the gaseous phase can be separated from the liquid or solid phase or from the mixture of solid and liquid phase at once, or the synthesis mixture forming within this step can be present in two-phase form: liquid/gaseous, solid/gaseous or liquid-solid/gaseous.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step can be identical to those of step 1, discussed above.

The residence time of this step is likewise not subject to any restrictions, but economic reasons generally dictate a range from about 10 minutes to about 10 hours, preferably about 60 to about 8 hours, particularly preferably about 60 minutes to about 6 hours.

The product mixture obtained in step 3 can be further processed as described below.

In a preferred embodiment, the product mixture of step 3 is subjected to a postcondensation in step 4 at temperatures from about 200 to about 350° C., preferably at temperatures from about 220 to 300° C., especially from about 240 to 270° C. Step 4 is carried out at a pressure which is below the pressure of step 3 and is preferably be within the range from about 5 to $1000 \times 10^3$ Pa, more preferably within the range from about 10 to about $300 \times 10^3$ Pa. In the context of this step, the temperature and pressure are selected so as to obtain a second gas phase and a second liquid or solid phase or a mixture of second liquid and second solid phase which each comprise the polyamide.

The postcondensation of step 4 is preferably carried out in such a way that the relative viscosity (measured at a temperature of 25° C. and a concentration of 1 g of polymer per 100 ml in 96% strength by weight of sulfuric acid) of the polyamide assume a value within the range from about 1.6 to about 3.5.

In a preferred embodiment, any water present in the liquid phase can be expelled by means of an inert gas such as nitrogen.

The residence time of the reaction mixture in step 4 depends especially on the desired relative viscosity, the temperature, the pressure and the amount of water added in step 3.

If step 3 is operated as a single-phase regime, the product line between step 3 and step 4 may optionally contain packing elements, for example Raschig rings or Sulzer mixing elements, which allow a controlled expansion of the reaction mixture in the gas phase.

The fourth step too can be operated using the catalyst of the invention. The use of the catalyst in step 4 improves the molecular weight buildup especially when the relative viscosity of the effluent from the third or—in the case of the three-step procedure—second step is less than RV=1.6—and/or the molar nitrile group and acid amide content in the polymer is greater than 1%, each based on the moles of aminonitrile used.

In a further embodiment of the invention, step 3 may be dispensed with and the polyamide is prepared by carrying out steps (1), (2) and (4).

This variant is preferably carried out as follows:

In step 1, the reaction is carried out as described above.

The reaction mixture is treated in step 2 as described above or at a temperature within the range from about 220 to about 300° C. and a pressure within the range from about 1 to about $7 \times 10^6$ Pa, the pressure in step 2 being at least $0.5 \times 10^6$ Pa lower than in step 1. At the same time, the resulting first gas phase is separated from the first liquid phase.

The first liquid phase obtained in step 2 is treated in step 4 as in step 1 or at a temperature within the range from about 220 to 300° C. and a pressure within the range from about 10 to about $300 \times 10^3$ Pa, the resulting second, water- and ammonia-comprising gas phase being separated from the second liquid phase. Within this step, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

In a further preferred embodiment of the present invention, at least one of the gas phases obtained in the respective steps can be recycled into at least one of the preceding steps.

It is further preferable to select the temperature and pressure in step 1 or in step 3 or in both step 1 and step 3 so as to obtain a liquid or a solid phase or a mixture of liquid and solid phase and a gaseous phase and to separate off the gaseous phase.

In the drawing,

FIG. 1 illustrates an apparatus for carrying out the process of the invention.

Key to Abbreviations

| V   | feed              |
|-----|-------------------|
| ACN | aminocapronitrile |
| 1   | step 1            |
| 2   | step 2            |
| 3   | step 3            |
| 4   | step 4            |
| A   | effluent          |

Furthermore, in the context of the process of the invention, it is also possible to carry out a chain lengthening or branching or a combination thereof. For this purpose, polymer branching or chain-lengthening substances known to a person skilled in the art are added in the individual steps. These substances are preferably added in step 3 or 4.
Usable substances are:

Trifunctional amines or carboxylic acids as branchers or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

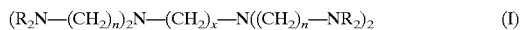 (I)

where
R is H or —(CH$_2$)$_n$—NR$^1$$_2$, where
R$^1$ is H or —(CH$_2$)$_n$—NR$^2$$_2$, where
R$^2$ is H or —(CH$_2$)$_n$—NR$^3$$_2$, where
R$^3$ is H or —(CH$_2$)$_n$—NH$_2$,
n is an integer from 2 to 6, and
x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a —(CH$_2$)$_n$—NH$_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetracarboxylic acid, phthalocyanine, naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-4 312 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 μmol/g of polyamide, preferably from 1 to 35, particularly preferably from 1 to 20, μmol/g of polyamide. The substances are preferably present in an amount from 3 to 150, particularly preferably from 5 to 100, especially from 10 to 70, μmol of equivalents/g of polyamide. The equivalents are based on the number of functional amino groups or carboxylic acid groups.

Difunctional carboxylic acids or difunctional amines serve as chain lengtheners. These have 2 carboxylic acid groups which can be reacted with amino groups, or 2 amino groups which can be reacted with carboxylic acids. The difunctional carboxylic acids or amines, besides the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as C$_{1-14}$-alkylenediamine, preferably C$_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylenediamine, from Hüls AG). Entire amines can each be substituted by C$_{1-12}$-alkyl, preferably C$_{1-14}$-alkyl, radicals on the carbon skeleton.

Difunctional carboxylic acids are for example those which form salts with difunctional diamines. They can be linear aliphatic dicarboxylic acids, which are preferably C$_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks (c) are preferably used in amounts from 1 to 55, particularly preferably from 1 to 30, especially from 1 to 15, μm/g of polyamide.

According to the invention, the product mixture obtained in step 3, or the second liquid or second solid phase or the mixture of second liquid and second solid phase (from step 4) which each comprise the polyamide, preferably a polymer melt, is discharged from the reaction vessel in a conventional manner, for example by means of a pump. Subsequently, the polyamide obtained can be worked up according to conventional methods, as described for example in DE-A 4 321 683 (page 3 line 54 to page 4 line 3) at length.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents obtained in this after-treatment, such as caprolactam, linear caprolactam oligomer and cyclic caprolactam oligomer, can be recycled into the first and/or second and/or third step.

The starting mixture and the reaction mixture can be admixed in all steps with chain regulators such as aliphatic and aromatic carboxylic and dicarboxylic acids, and catalysts such as acid-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth steps. Particular preference is given to using fillers and additives whenever the synthesis or polymer mixture will not encounter fixed bed catalysts in the rest of the processing. One or more impact-modifying rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than −10° C., preferably less than −30° C., and they contain at least one functional group which is capable of interaction with the polyamide. Suitable functional groups include for example carboxylic acid, carboxylic anhydride, carboxylic ester, carboxylic amide, carboxylic imide, amino, hydroxyl, epoxide, urethane and oxazoline groups.

Rubbers which enhance the toughness of the blends include for example:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers A, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft constituent. A hard constituent is customarily a polymer having a glass transition temperature of at least 25° C., while a soft constituent is a polymer having a glass transition temperature of not more than 0° C. These products have a structure made up of a core and at least one shell, the structure being the result of the order in which the monomers are added. The soft constituents are generally derived from butadiene, isoprene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be, for example, reacted with γ-mercaptopropylmethyldimethoxysilane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard constituents are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid amide, acid imide, carboxylic ester, amino, hydroxyl, epoxy, oxazoline, urethane, urea, lactam or halobenzyl groups is here preferably effected by the addition of suitably functionalized monomers during the polymerization of the last shell. Suitable functionalized monomers include for example maleic acid, maleic anhydride, mono- or diesters or maleic acid, tert-butyl (meth)acrylate, acrylic acid, glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard constituents is generally within the range from 1:9 to 9:1, preferably within the range from 3:7 to 8:2.

Such rubbers, which enhance the toughness of polyamides, are known per se and described in EP-A-0 208 187, for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers.

As further additives there may be mentioned for example processing aids, stabilizers and oxidation retardants, agents against thermal decomposition and decomposition by ultraviolet light, lubricating and demolding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3 \cdot Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black ($Cu(Cr, Fe)_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente fur Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The present invention further provides a polyamide preparable by any of the foregoing processes.

The examples which follow illustrate the invention.

EXAMPLES

Sample Preparation and Analysis

The relative viscosity (RV), a measure of the molecular weight buildup and the degree of polymerization, was measured in 1% strength by weight solution in the case of extracted material and in 1.1% strength by weight solution in the case of unextracted polymer, in 96% strength sulfuric acid, at 25° C. using an Ubbelohde viscometer. Unextracted polymers were dried under reduced pressure for 20 hours prior to analysis.

The amino and carboxyl end group contents were determined on extracted polycaprolactam by an acidimetric titration. The amino groups were titrated with perchloric acid in 70:30 (parts by weight) phenol/methanol as solvent. The carboxyl end groups were titrated with potassium hydroxide solution in benzyl alcohol as solvent.

For extraction, 100 parts by weight of polycaprolactam were stirred with 400 parts by weight of demineralized water at 100° C. for 32 hours and refluxed and, after removal of the water, dried gently, i.e., without postcondensation, at 100° C. under reduced pressure for 20 hours.

Catalysts

Catalyst 1 Beta-zeolite Powder

The catalyst used was a beta-zeolite from Uetikon (Zeokat-Beta) having the following composition: $SiO_2$=91%, $Al_2O_3$=7.8%, $Na_2O$=0.5%, $K_2O$=0.7%, BET surface area=700 m$^2$/g, pore size in Å=7.6×6.7; 5.5×5.5, particle size 0.2–0.5 μm.

Catalyst 2 Beta-zeolite Extrudates 220 g of β-zeolite from Example 1 were kneaded with 5% of Walocel® and 230 g of water for 45 minutes. The material was then molded under a pressure of 70 bar into 2 mm extrudates. These were dried at 110° C. and calcined at 500° C. for 16 h.

195 g of these extrudates were exchanged with 3 liters of 20% strength $NH_4Cl$ solution at 80° C. for 2 h and then washed with 10 l of water. Thereafter a second exchange was effected again with 3 l of 20% strength $NH_4Cl$ solution at 80° C./2 h and the product was washed Cl-free. Drying at 110° C. was followed by 5 h of calcination at 500° C.

Catalyst 3 Sheet-silicate Type K10®

K10® is an acid-treated montmorillonite from Süd-Chemie. It has a BET surface area of 180–220 m$^2$/g and an ion exchange equivalent of 40–50 meq/100 g.

Catalysts 4 and 5 $TiO_2$ Extrudates of 100% and 84% Anatase, Respectively

Preparation is in line with the description in Ertl, Knözinger, Weitkamp: "Handbook of heterogeneous catalysis", VCH Weinheim, 1997; page 98ff. The $TiO_2$ polymorphs described as particularly preferred in the preceding description were mixed with water, silica sol and glycerol, extruded and calcined at 550° C.

Catalyst 6 Titanium Dioxide/tungsten Oxide Catalyst

The catalyst used was obtained by intimately mixing the commercially available titanium dioxide VKR 611 (from Sachtleben) with tungsten oxide and subsequent extrusion as per Example 2 or 4.

It has the following specification: 20% by weight of $WO_3$, 80% by weight of $TiO_2$; BET surface area=73 m$^2$/g, total acidity ($pK_a$=6.8)=0.56 mmol/g; total acidity ($PK_a$=−3)=0.035 mmol/g.

Procedure

All the experiments were carried out in a multistage Miniplant apparatus using aminocapronitrile (ACN) and water ($H_2O$) as reactants from a feed vessel V, which is depicted in FIG. 1. The first process stage (1), having an empty volume of 1 liter and an internal length of 1000 mm, was completely packed with Raschig ring packing elements (diameter 3 mm, length 3 mm, for comparison) or with titanium dioxide pellets (catalyst 4). The pellets were 100% $TiO_2$ in the anatase form and had a strand length within the range from 2 to 14 mm, a strand thickness of about 4 mm and a specific surface area of about 50 m$^2$/g. The second stage (2) was a 2 liter capacity separating vessel. The third stage (3) was a flow tube (volume 1 l, length 1000 mm) packed with Raschig rings (diameter 6 mm, length 6 mm, for comparison) or with the above-described $TiO_2$ pellets. The fourth process stage (4) was in turn a separating vessel (volume 2 l), from which the polymer melt prepared was extruded in strand form (A) with the aid of a gear pump.

Tabular Representation of Examples

The process parameters and the product properties are depicted in table form below. The throughput is the mass flow of reaction mixture through the first process stage/step.

Process Parameters

| Examples | ACN:H2O (molar) | Stage 1 Catalyst[2] | P[bar] | T[° C.] | Stage 2 Level [%] | P[bar] | T[° C.] | Stage 3 Catalyst[2] | WA[1][%] | P[bar] | T[° C.] |
|---|---|---|---|---|---|---|---|---|---|---|---|
| 1.1 | 1:2 | TiO$_2$ | 55 | 220 | 25 | 30 | 250 | without | 10 | 50 | 250 |
| C1.1 | 1:2 | without | 90 | 270 | 50 | 30 | 240 | without | 17 | 34 | 240 |
| 2.1 | 1:4 | TiO$_2$ | 55 | 240 | 25 | 30 | 250 | without | 10 | 50 | 250 |
| C2.1 | 1:4 | without | 90 | 275 | 50 | 25 | 270 | without | 17 | 34 | 250 |
| 3.1 | 1:4 | TiO$_2$ | 50 | 230 | 10 | 30 | 246 | without | 10 | 55 | 250 |
| 3.2 | 1:6 | TiO$_2$ | 55 | 240 | 25 | 30 | 246 | without | 10 | 34 | 251 |
| 3.3 | 1:6 | TiO$_2$ | 55 | 240 | 25 | 30 | 246 | without | 10 | 34 | 251 |

The reaction mixtures and melts from the third stage were postcondensed at 250° C. in a fourth stage.
[1]WA = Water added in third stage, based on inlet stream of reaction mixture into first process stage.
[2]"without" signifies a bed with Raschig rings

| Examples | ACN:H2O (molar) | Stage 1 Catalyst | P[bar] | T[° C.] | Stage 2 Level [%] | P[bar] | T[° C.] | Stage 3 Catalyst | WA[1][%] | P[bar] | T[° C.] |
|---|---|---|---|---|---|---|---|---|---|---|---|
| 4.1 & 4.2 | 1:6 | TiO$_2$ | 55 | 240 | 25 | 30 | 247 | TiO$_2$ | 10 | 37 | 243 |
| 4.3 | 1:6 | TiO$_2$ | 55 | 240 | 25 | 30 | 250 | without | 10 | 50 | 250 |
| 5.1 | 1:4 | TiO$_2$ | 60 | 240 | 25 | 40 | 250 | TiO$_2$ | 0 | 38 | 240 |
| 5.2 | 1:4 | TiO$_2$ | 60 | 240 | 25 | 40 | 250 | TiO$_2$ | 10 | 38 | 240 |
| 6.1 | 1:4 | TiO$_2$ | 60 | 250 | 25 | 30 | 250 | TiO$_2$ | 10 | 41 | 242 |
| 6.2 | 1:4 | TiO$_2$ | 60 | 250 | 10 | 15 | 260 | without | 30 | 55 | 257 |
| 6.3 | 1:4 | TiO$_2$ | 55 | 240 | 25 | 30 | 250 | without | 10 | 50 | 250 |

Results in Comparison

Example 1

Doubling of throughput for unchanged molecular weight of end product through use of catalyst in process stage 1.
Purity of aminocapronitrile used: 99%.

| Example | Catalyst | Throughput [g/h] | Relative product viscosity |
|---|---|---|---|
| 1.1 | TiO$_2$ | 600 | 1.48 |
| C1.1 | without catalyst | 600 | 1.30 |
| C1.2 | without catalyst | 300 | 1.49 |

Example 2

Improvement in relative product viscosity coupled with simultaneous increase in throughput by 50% through use of catalyst in process stage 1.
Purity of aminocapronitrile used: 99%.

| Example | Catalyst | Throughput [g/h] | Relative product viscosity |
|---|---|---|---|
| 2.1 | TiO$_2$ | 600 | 1.68 |
| C2.1 | without catalyst | 600 | 1.51 |
| C2.2 | without catalyst | 400 | 1.52 |

Example 3

Dependence of relative product viscosity on purity of aminocapronitrile used and on process parameters. Catalyst use in process stage 1.

| Example | Catalyst | ACN purity [%] | Throughput [g/h] | Relative product viscosity |
|---|---|---|---|---|
| 3.1 | TiO$_2$ | 99.0 | 300 | 1.81 |
| 3.2 | TiO$_2$ | 99.0 | 600 | 1.86 |
| 3.3 | TiO$_2$ | 99.5 | 600 | 2.03 |

Example 4

Improved product properties, i.e., increased molecular weight and increased carboxyl end group (CEG) content of end product, through use of catalyst in process stages 1 and 2.

Purity of aminocapronitrile used: 99%
Molar ACN:water mixing ratio=1:6.

| Example | Catalyst (stage 1) | Catalyst (stage 2) | Throughput [g/h] | Relative product viscosity | CEG |
|---|---|---|---|---|---|
| 4.1 | TiO$_2$ | TiO$_2$ | 200 | 1.81 | 81 |
| 4.2 | TiO$_2$ | TiO$_2$ | 600 | 1.77 | 91 |
| 4.3 | TiO$_2$ | without catalyst | 600 | 1.65 | 59 |

Example 5

Improved product properties, i.e., increased molecular weight and increased carboxyl end group (CEG) content of end product, through continuous addition of water to third process stage packed with catalyst pellets.

Purity of aminocapronitrile used: 99%

Catalyst use in process stages 1 and 2.

| Example 5 | Catalyst (stage 1) | Catalyst (stage 2) | Water added in stage 3 [%] | Through-put [g/h] | Relative product viscosity | CEG |
|---|---|---|---|---|---|---|
| 5.1 | TiO$_2$ | TiO$_2$ | 10 | 600 | 1.66 | 77 |
| 5.2 | TiO$_2$ | TiO$_2$ | 0 | 600 | 1.58 | 59 |

Example 6

Improved product properties, i.e., increased molecular weight and increased carboxyl end group (CEG) content of end product, through use of catalyst in process stages 1 and 2.

Purity of aminocapronitrile used: 99%

Molar ACN:water mixing ratio=1:4.

| Example 6 | Catalyst (stage 1) | Catalyst (stage 2) | Throughput [g/h] | Relative product viscosity | CEG |
|---|---|---|---|---|---|
| 6.1 | TiO$_2$ | TiO$_2$ | 600 | 1.73 | 94 |
| 6.2 | TiO$_2$ | without catalyst | 600 | 1.68 | 71 |
| 6.3 | TiO$_2$ | without catalyst | 600 | 1.64 | 67 |

Process Parameters

| Examples | ACN:H2O (molar) | Stage 1 | | | | Stage 2 | | | Stage 3 | | |
|---|---|---|---|---|---|---|---|---|---|---|---|
| | | Catalyst | P[bar] | T[° C.] | Level [%] | P[bar] | T[° C.] | Catalyst | WA$^1$[%] | P[bar] | T[° C.] |
| C7.1 | 1:6 | without | 87 | 261 | 25 | 32 | 246 | without | 10 | 34 | 251 |
| C7.2 | 1:6 | without | 90 | 252 | 26 | 30 | 248 | without | 10 | 34 | 252 |
| C7.3 | 1:6 | without | 89 | 270 | 25 | 31 | 246 | without | 10 | 32 | 250 |
| 7 | 1:6 | TiO$_2$ | 55 | 240 | 25 | 30 | 246 | without | 10 | 34 | 251 |

The reaction mixtures and melts from the third stage were postcondensed at 250° C. in a fourth stage.
$^1$WA = Water added in third stage, based on inlet stream of reaction mixture into first process stage.

Results in Comparison

Example 7

Increased final viscosity, increased space-time yield and throughput and reduced reaction pressure and temperature through use of catalyst in process stage 1.

Purity of aminocapronitrile used: 99.5%

| Example | Catalyst | Throughput [g/h] | T (stage 1) [° C.] | P (stage 1) [° C.] | Relative product viscosity |
|---|---|---|---|---|---|
| 7 | TiO$_2$ | 600 | 240 | 55 | 2.03 |
| C7.1 | without | 155 | 261 | 87 | 1.56 |
| C7.2 | without | 300 | 252 | 90 | 1.30 |
| C7.3 | without | 460 | 270 | 89 | 1.25 |

We claim:

1. A continuous process for preparing a polyamide by reaction of at least one aminonitrile with water, which comprises:
   (1) reacting at least one aminonitrile with water at a temperature from 90 to 400° C. and a pressure from 0.1 to 35×10$^6$ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture,
   (2) further reacting the reaction mixture at a temperature from 150 to 400° C. and a pressure which is lower than the pressure in step 1, in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and
   (3) admixing the first liquid or the first solid phase or the mixture of first liquid and first solid phase with a gaseous or liquid phase comprising water at a temperature from 150 to 370° C. and a pressure from 0.1 to 30×10$^6$ Pa, optionally in a flow tube, containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a product mixture.

2. A process as claimed in claim 1, further comprising the following step:
   (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

3. A continuous process for preparing a polyamide by reaction of at least one aminonitrile with water, which comprises:
   (1) reacting at least one aminonitrile with water at a temperature from 90 to 400° C. and a pressure from 0.1 to 35×10⁶ Pa in a flow tube containing a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide to obtain a reaction mixture, (2) further reacting the reaction mixture at a temperature from 150 to 400° C. and a pressure which is lower than the pressure in step 1, in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (4) postcondensing the first liquid or the first solid phase or the mixture of first liquid and first solid phase at a temperature from 200 to 350° C. and a pressure which is lower than the pressure of step 2, the temperature and pressure being selected so as to obtain a second, water- and ammonia-comprising gas phase and a second liquid or second solid phase or a mixture of second liquid and second solid phase, which each comprise the polyamide.

4. A process as claimed in claim 1, wherein the temperature and pressure in step 1 or in step 3 or in both step 1 and step 3 are selected so as to obtain a liquid or a solid phase or a mixture of liquid and solid phase and a gaseous phase, and the gaseous phase is separated off.

5. A process as claimed in claim 1, wherein the reaction of step 1 is carried out using a molar ratio of aminonitrile to water of from 1:1 to 1:30.

6. A process as claimed in claim 1, wherein, in step 3, the gaseous or liquid phase comprising water is added in an amount from 50 to 1500 ml of water per 1 kg of first liquid or first solid phase or mixture of first liquid and first solid phase.

7. A process as claimed in claim 1, wherein at least one of the gas phases obtained in the respective steps is recycled into at least one of the preceding steps.

8. A process as claimed in claim 1, wherein the aminonitrile used is an ω-aminoalkyl nitrile having an alkylene moiety ($-CH_2-$) of from 4 to 12 carbon atoms or an aminoalkylaryl nitrile having from 8 to 13 carbon atoms.

9. A process as claimed in claim 1, wherein the following mixture is used:

from 50 to 99.99% by weight of 6-aminocapronitrile, from 0.01 to 50% by weight of at least one dicarboxylic acid selected from the group consisting of aliphatic $C_4$–$C_{12}$-dicarboxylic acids and $C_5$–$C_8$-cycloalkanedicarboxylic acids, from 0 to 50% by weight of an α,ω-diamine having 4–10 carbon atoms, from 0 to 50% by weight of an α,ω-$C_2$–$C_{12}$-dinitrile, and from 0 to 50% by weight of an α,ω-$C_5$–$C_{12}$-amino acid or of the corresponding lactam, from 0 to 10% by weight of at least one inorganic acid or salt thereof, the individual weight percentages adding up to 100%.

* * * * *

UNITED STATES PATENT AND TRADEMARK OFFICE
CERTIFICATE OF CORRECTION

PATENT NO.     : 6,316,588 B1
DATED          : November 13, 2001
INVENTOR(S)    : Mohrschladt et al.

It is certified that error appears in the above-identified patent and that said Letters Patent is hereby corrected as shown below:

Column 20,
Line 32, "Br-önsted" should be -- Brönsted --.

Column 22,
Line 24, "$C_4$-$C_{12}$-" should be -- $C_4$-$C_{10}$-$\alpha,\omega$- --.
Line 26, after "acids" insert --, aromatic $C_8$-$C_{12}$-dicarboxylic acids --.

Signed and Sealed this

Twentieth Day of August, 2002

Attest:

Attesting Officer

JAMES E. ROGAN
Director of the United States Patent and Trademark Office